Nov. 14, 1961  E. LONGFELLOW  3,008,738
GAS APPLIANCE CONNECTOR
Filed March 5, 1958

INVENTOR.
EARL LONGFELLOW
BY
ATTORNEY 3,008,738
GAS APPLIANCE CONNECTOR
Earl Longfellow, 421 W. 21st St., New York, N.Y.
Filed Mar. 5, 1958, Ser. No. 719,307
3 Claims. (Cl. 285—329)

This invention relates to flexible corrugated metallic tubes of the type used as gas appliance connectors and has for its primary purpose the provision of an improved connector providing advantages in the connecting of an end thereof in fluid tight relation to a gas appliance or gas piping.

There are certain basic requirements of construction and performance that connectors of the indicated type must satisfy before they can be approved for use with gas appliances. Among other things, such connectors should be corrosion resistant to sulphides, should not require the use of gaskets to assure gas tightness of the fittings, and should be capable of withstanding a temperature of 1000° F. without leakage. Further, such connectors should be able to make a leak-proof connection with a low torque tightening of the fitting not to exceed 400 lb.-in. per inch of tubing diameter. Also, the connector should not leak when after being so connected, it is disconnected and then reconnected by the application of a torque not exceeding such 400 lb.-in. per inch of tubing diameter. An attached connector should be able to withstand, without leakage and without becoming detached, a steady lengthwise pull of 800 lbs. per inch of nominal inside diameter for five minutes. It should also not leak, break or be otherwise adversely affected by the application of a tightening torque of 1040 lb.-in. per inch of nominal tubing diameter. A further requirement is that at least one end of the connector shall be equipped with a union fitting. As a result of these and other requirements, many of the means heretofore provided on connectors for coupling the same to gas appliances and piping have been complicated in construction and expensive to make.

One of the objects of the present invention is to provide a flexible metallic gas appliance connector capable of satisfying the stringent tests for certification and yet having such simple construction that it can be made in quantity at a substantially lower cost than many known types of appliance connectors.

Another object of the invention is to provide an improved appliance connector capable of being easily applied without the use of skill or special tools to provide a leak-proof coupling.

Figure 1:
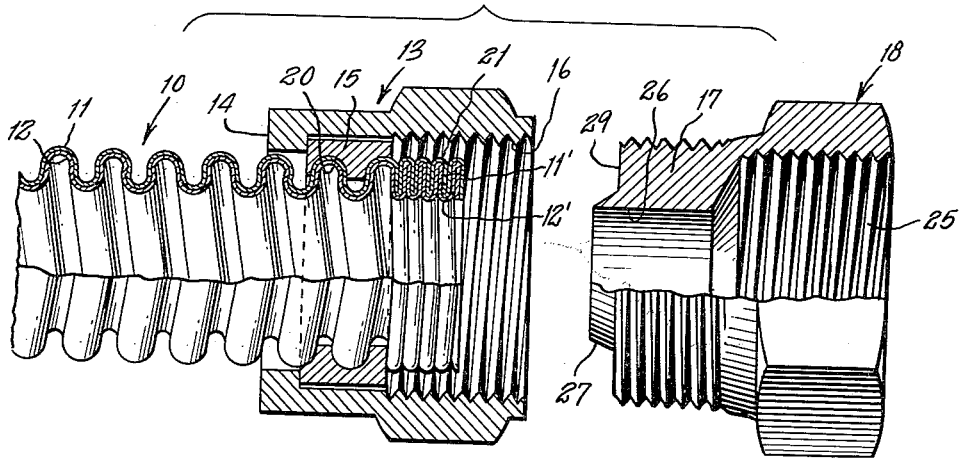
Figure 2:
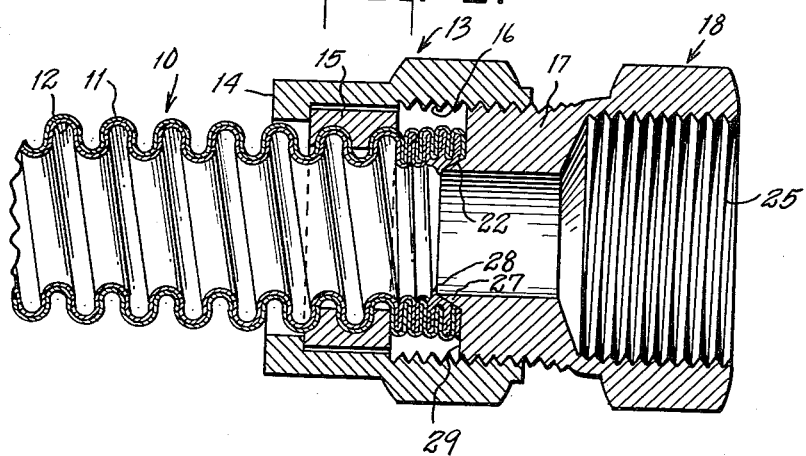

Other objects, as well as the advantages of the invention, will become apparent after a perusal of the following description when read in connection with the accompanying drawings, in which FIG. 1 is an exploded sectional elevation of one end of a flexible corrugated metallic appliance connector embodying the invention and shows the construction of the tubing end thereof before the connector has been applied to a gas appliance or gas piping; and FIG. 2 is a view similar to FIG. 1, but shows the coupling members assembled and the manner in which the tube end is deformed by such assemblage of the coupling members to form a leak-proof joint.

In the drawings, the reference numeral 10 indicates generally the flexible metallic tube of the connector. The tube 10 is a compound tube composed of an outer spirally corrugated tube 11 and an inner spirally corrugated tube 12. The outer tube 11 is made of a hard metal such as brass to provide the connector with the desired strength and wear resistance. The inner tube 12, on the other hand, is made of a relatively softer metal that is capable of being compressed or deformed under low torque tightening as will hereinafter become more clear and yet can withstand a temperature of 1000° F. without melting. A metal having the aforesaid desired characteristics for inner tube 12 is aluminum, which in its pure or alloyed form is also capable of affording protection against sulphur that may be in the gas conducted through such tube. The inner tube 12 by preference closely fits the bore of the outer tube 11 and, at least at the ends, the two tubes may be joined together in any suitable manner as by compression or fusion to assure manipulation of the two tubes as a unit.

The compound tube 10 can be formed in any desired manner known to the art for forming a spirally corrugated compound metal tubing to provide a conduit of suitable flexibility for use with gas appliances. As formed, the compound tube 10 has the spiral configuration depicted in the left hand ends of the tube portions shown in the drawings and the two tubes 11 and 12 which go to make up such compound tube are of substantially equal length. In forming the connector of the invention, a pair of steel coupling nuts 13 may first be assembled on a predetermined section of the compound tubing. As illustrated, each of the coupling nuts has an internal end flange 14 which engages a ring 15 secured to the tubing section and an internal thread 16 which threadedly engages with the externally threaded portion 17 of a steel coupling member 18. The two coupling members or nuts 13 are assembled on the tubing section so that the flanges 14 thereof are between the rings 15 and the threaded ends thereof project toward the ends of such section. The section of compound tubing may then have threaded on its ends the steel rings 15 which are each provided on its inner surface with a spiral groove 20 corresponding in pitch and shape to the outer corrugations on such section. The steel rings 15 preferably are each positioned on the section of tubing at a place spaced from the associated end of the latter to provide four corrugations of the tubing between such associated end and ring. These four corrugations are then flattened on top of the threaded steel ring to lock the latter in place on the tubing and to provide a substantially rigid portion 21 of tubing in which a gas or fluid-tight seat 22 for the coupling member 18 may thereafter be formed (note FIG. 2) and which at the same time will act as part of the union fitting in the application of the connector to a gas appliance or piping.

The foregoing operations complete the construction of the connector in the form in which it is supplied to the user. As shown in FIG. 1 of the drawings, the flattened corrugations in each of the end portions 21 of the thus completed connector form a compact, solid mass of annular shape and high rigidity. The inner corrugated aluminum wall 12' in each end portion 21 may have the same thickness as inner wall 12, or may be thickened by applying sufficient pressure in the flattening of the corrugations to cause the aluminum located between the collapsed walls 11' of brass in end portion 21 to be extruded into such wall 12'. Before forwarding the connector to the user, the nuts 13 may be screwed onto the threaded portions 17 of the coupling members 18 sufficiently to assure that the assemblage will stay together during shipping and handling.

It will be noted in the drawings that the coupling members 18 each include a body portion which is flattened on its exterior surface for wrench engagement and which has an internally threaded portion 25 to receive a threaded part of a gas appliance or gas piping. The passage defined by the internal thread 25 communicates with a reduced passage 26 extending through the threaded portion 17 of the coupling member. At the outer end of passage 26, the coupling member is provided with a conical outer surface 27 adapted to enter into the opposing associated end portion 21 of tube 10. When the associated coupling members 13 and 18 are screwed together on an end portion 21, the end 27 of coupling member 18 is forced into the passage of such end portion. Under the pressure applied to the coupling members, the aluminum material engaged by the coupling end 27 is caused to flow so as to progressively form the conically-shaped seat 22, the seating surface of which will perfectly mate with every portion of the conical surface of coupling end 27 and together with the latter will form a joint that is leak-proof and capable of passing all tests to which it may be subjected for certification. As is shown in FIG. 2 of the drawings, in the formation of the seat 22 the terminal edge of the outermost brass wall 11′ in tube portion 21 is bent in a curved fashion so that it forms, in part at least, the outer edge portion of the seat 22. This bent brass edge smoothly joins with the aluminum which has been caused to flow inwardly both longitudinally and radially so that at the inner end of the seat the diameter of the opening therethrough is less than the inside diameter of the compound tube 10. The coupling end 27 during this working of the aluminum has a tendency also to form a slight shoulder 28 of aluminum at the inner end of the seat 22, which shoulder enhances the gas-tight connection formed between the coupling end 27 and seat 22. To complete the formation of the seal, the coupling end 27 is advanced in a longitudinal direction until the flat shoulder 29 formed on the coupling member 18 at the inner terminus of end 27 engages the terminal end of the tube portion 21. Thus, the complete seal is accomplished by the engagement of the coupling end 27 with the seat 22 and shoulder 28 and by the engagement of the shoulder 29 with the terminal end of the tube end portion 21. In certain situations the coupling end 27 may be advanced into the end portion 21 a distance greater than its length in a longitudinal direction, in which case, the seat 22 will extend a greater distance into the end portion 21 and the outer corrugations forming such portion may be somewhat expanded. The terminal end of these expanded corrugations however will still form a seal with the flat shoulder 29 which is of sufficient width to take care of such expansion. If it is found necessary to disconnect the coupled end portion 21 for any reason, a new connection may be made in the manner above described without the necessity of trying to match the previously engaged surfaces of the joint, since as pressure is applied to the coupling members the aluminum in the end portion 21 will be caused to flow to form a perfect seal with the exterior surface of the coupling end 27 and a new seal will be formed between the end of the tube and shoulder 29.

While I have hereinabove described and illustrated in the accompanying drawings a preferred embodiment of my invention, it will be understood by those skilled in the art that various changes and modifications may be made therein without departing from the spirit of the invention or the scope of the appended claims.

I claim:

1. A gas appliance connector comprising a flexible metallic composite tubing constituted of a plurality of complete tubes positioned one within the other, each of said complete tubes being a corrugated flexible metallic tube and the opposed surfaces of said tubes being contiguous throughout the corrugated lengths of such tubes, the inner of said tubes being composed of a metal which is softer than the metal of the outer tube, is deformable under low torque tightening and will withstand a temperature of 1000° F. without melting, a solid ring secured adjacent an end portion of said tubing, the end of said tubing beyond said ring being longitudinally compressed, a first coupling member connected to said tubing by said ring, and a second coupling member threadedly engageable with said first coupling member and having on its inner end a projecting solid conically-shaped member insertable into said compressed end portion of the tubing and a transverse shoulder located outwardly of said conically-shaped member and engageable with said tubing end upon such insertion of said coupling member end, said first coupling member being rotatably engaged with said solid ring and adapted to carry said solid ring and the tubing secured thereto axially in engagement with said conically-shaped member upon threaded engagement of said first and said second coupling members, and the smaller diameter of the exterior conical surface on said conically-shaped member being substantially equal to but not greater than the internal diameter of the corrugated tubing, said coupling member end being operable under pressure applied to said coupling members and the resulting longitudinal forces created between said solid ring and said coupling member end to cause an extrusion of the metal of the inner layer of tubing engaged by said end on said compressed end portion such as to cause such extruded metal to form a seal with said coupling member end, said engaged parts of said tubing including said extruded metal of the inner layer of tubing, and said coupling member end coacting to provide a leakproof joint between said tubing and said second coupling member.

2. A gas appliance connector comprising a flexible metallic composite tubing constituted of a plurality of complete tubes positioned one within the other, each of said complete tubes being a corrugated flexible metallic tube and the opposed surfaces of said tubes being contiguous throughout the corrugated lengths of such tubes, the outer of said tubes being made of brass and the inner of said tubes being made of deformable aluminum, a solid ring secured adjacent an end portion of said tubing, the end of said tubing beyond said ring being longitudinally compressed, a first coupling member connected to said tubing by said ring, and a second coupling member threadedly engageable with said first coupling member and having on its inner end a projecting solid conically-shaped member insertable into said compressed end portion of the tubing and a transverse shoulder located outwardly of said conically-shaped member and engageable with said tubing end upon such insertion of said coupling member end, said first coupling member being rotatably engaged with said solid ring and adapted to carry said solid ring and the tubing secured thereto axially in engagement with said conically-shaped member upon threaded engagement of said first and said second coupling members, and the smaller diameter of the exterior conical surface on said conically-shaped member being substantially equal to but not greater than the internal diameter of the corrugated tubing, said coupling member end being operable under pressure applied to said coupling members and the resulting longitudinal forces created between said solid ring and said coupling member end to cause an extrusion of the aluminum metal of the inner tube engaged by said end on said compressed end portion such as to cause such extruded metal to form a seal with said solid coupling member end, said engaged parts of said tubing including said extruded aluminum metal of the inner tube, and said coupling member end coacting to provide a leakproof joint between said tubing and said second coupling member.

3. A gas appliance connector comprising a flexible corrugated tubing having a plurality of the corrugations at one end thereof flattened under longitudinal compressions, the compressed end portion of said tubing having a lining of substantial thickness constituted of softer material than the material forming the exterior wall of said tubing, the material of said lining being deformable under low torque tightening and capable of withstanding a temperature of 1000° F. without melting, a first coupling member connected to said tubing, and a second coupling member threadedly engageable with said first coupling member and having on its inner end a projecting solid member insertable into said lining of said compressed end portion and having a conically-shaped exterior surface engageable with said lining, and said inner end having a transverse shoulder located outwardly of said projecting member and engageable with said tubing end upon such insertion of said coupling member end, said first coupling member being engaged with said tubing and adapted to carry said tubing axially into engagement with said conically-shaped exterior surface upon threaded engagement of said first and said second coupling members, and the smaller diameter of said conically-shaped exterior surface being substantially equal to but not greater than the internal diameter of the corrugated tubing, said coupling member end being operable under longitudinal pressure applied through said coupling members to cause an extrusion of said lining material engaged by said end such as to cause such extruded lining material to form a seal with said inner end, said engaged parts of said tubing including said extruded lining material, and said coupling member end coacting to provide a leakproof joint between said tubing and said second coupling member.

References Cited in the file of this patent

UNITED STATES PATENTS

| | | | |
|---|---|---|---|
| Re. 21,603 | Guarnaschelli | | Oct. 22, 1940 |
| 979,460 | Fulton | | Dec. 27, 1910 |
| 1,315,548 | Fletcher et al. | | Sept. 9, 1919 |
| 1,801,403 | White | | Apr. 21, 1931 |
| 2,041,543 | Guarnaschelli | | May 19, 1936 |
| 2,100,270 | Romine | | Nov. 23, 1937 |
| 2,490,686 | Guarnaschelli | | Dec. 6, 1949 |
| 2,739,828 | Schindler | | Mar. 27, 1956 |
| 2,745,797 | Long | | May 15, 1956 |
| 2,773,710 | Smith | | Dec. 11, 1956 |
| 2,823,933 | Hickman | | Feb. 18, 1958 |
| 2,832,613 | Farrar | | Apr. 29, 1958 |

FOREIGN PATENTS

| | | |
|---|---|---|
| 264,989 | Great Britain | Feb. 3, 1927 |
| 930,267 | France | Aug. 4, 1947 |
| 734,265 | Great Britain | July 27, 1955 |